(12) United States Patent
MacCurdy et al.

(10) Patent No.: US 10,132,931 B2
(45) Date of Patent: Nov. 20, 2018

(54) PROGRAMMABLE TRACKING DEVICE AND RELATED METHODS

(71) Applicant: Cornell University, Ithaca, NY (US)

(72) Inventors: Robert MacCurdy, Ithaca, NY (US); Steven Powell, Ithaca, NY (US); Richard Gabrielson, Vestal, NY (US); David Winkler, Ithaca, NY (US)

(73) Assignee: Cornell University, Ithaca, NY (US)

( * ) Notice: Subject to any disclaimer, the term of this patent is extended or adjusted under 35 U.S.C. 154(b) by 97 days.

(21) Appl. No.: 15/030,486

(22) PCT Filed: Oct. 23, 2014

(86) PCT No.: PCT/US2014/061954
§ 371 (c)(1),
(2) Date: Apr. 19, 2016

(87) PCT Pub. No.: WO2015/061560
PCT Pub. Date: Apr. 30, 2015

(65) Prior Publication Data
US 2016/0252624 A1 Sep. 1, 2016

Related U.S. Application Data

(60) Provisional application No. 61/894,543, filed on Oct. 23, 2013.

(51) Int. Cl.
*G01S 19/14* (2010.01)
*G01S 19/37* (2010.01)
*G01S 5/00* (2006.01)

(52) U.S. Cl.
CPC ............ *G01S 19/37* (2013.01); *G01S 5/0027* (2013.01); *G01S 19/14* (2013.01)

(58) Field of Classification Search
CPC ........... G01S 19/14; G01S 19/34; G01S 19/37
USPC .... 342/357.25, 357.52, 357.63, 357.77, 450, 342/463–465; 340/539.13, 573.2; 701/519

See application file for complete search history.

(56) References Cited

U.S. PATENT DOCUMENTS

| | | |
|---|---|---|
| 2005/0073409 A1 | 4/2005 | Durst |
| 2006/0040631 A1 | 2/2006 | Tso |
| 2007/0032220 A1 | 2/2007 | Feher |
| 2009/0006699 A1 | 1/2009 | Rofougaran |
| 2009/0140852 A1 | 6/2009 | Stolarczyk |
| 2012/0112917 A1 | 5/2012 | Menachem |
| 2012/0201277 A1 | 8/2012 | Tanner |
| 2012/0235709 A1 | 9/2012 | Wenink |

*Primary Examiner* — Dao L Phan
(74) *Attorney, Agent, or Firm* — Valauskas Corder LLC

(57) ABSTRACT

An extremely small, simple, digitally controlled tracking device provides greater transceiver functionality by being programmable across a wide frequency range and various modulation formats with the same circuit components. Additionally, the programmable nature of the tracking device provides reliable scheduling functionality.

20 Claims, 2 Drawing Sheets

PROGRAMMABLE TRACKING DEVICE AND RELATED METHODS

CROSS-REFERENCE TO RELATED APPLICATIONS

This application claims the benefit of U.S. Provisional Patent Application No. 61/894,543 filed Oct. 23, 2013, which is incorporated by reference.

FIELD OF THE INVENTION

The invention relates to tracking objects. More specifically, the invention is directed to a tracking device that is programmable to accommodate a wide frequency range and various modulation formats in addition to including a reliable scheduling functionality.

BACKGROUND OF THE INVENTION

Tracking objects, such as wildlife, is a long-established practice worldwide. Typically, radio tracking is performed via small animal-carried transmitters or tags. Certain tags are based on designs that are over 50 years old. Tags operate by emitting a continuous wave (CW) radio-frequency (RF) signal at pre-defined intervals. A directional antenna is oriented to maximize the received signal strength, yielding a line of bearing toward the tag.

For example, a typical tracking application involves teams of tracking field technicians, who follow an animal on foot, using a handheld antenna to obtain lines of bearing. This operation is labor-intensive, and inevitably involves downtime, during which any transmissions from the tag are useless and waste precious battery energy. Although continuous refinements have been made to tags including refinements that have yielded very small, lightweight incarnations, some of these incarnations have limited battery life.

Conventional tracking systems may employ a satellite-based positioning system, for example, a Global Navigation Satellite System (GNSS) such as the Global Positioning System (GPS). These systems typically include a receiver to estimate position for an object, such as an animal. However, in certain circumstances there may be interference with satellite signals used to estimate position of the object such as during satellite outages, canopy cover or any other interference. As an example, a GPS-based animal tracking system typically provides approximately 70%-80% coverage, and sometimes as low as 20%-30% due to canopy induced signal loss. Another disadvantage includes that certain movement paths and movement rates must be inferred from available GPS data.

Certain existing tags can be used to track animal migration and address environmental challenges such as climate and land use change, biodiversity to invasive species, and the spread of infectious diseases. However, cost limits their use to projects with sizable research budgets.

In addition, certain tags are complex resulting in a large size with limited use. For example, larger tags may only be used by larger objects or animals. Furthermore, larger sized tags are bulky to transport.

In addition, available tags fail with respect to scheduling flexibility, operating frequency flexibility, modulation flexibility, bill of materials/cost, and tag mass.

Virtually all commercial tags utilize the same or similar design employing an electromechanical frequency crystal to set the operating frequency of the tag, and several discrete circuit elements to control the tag transmit interval. Most tracking applications require unique operating frequencies for each tag deployed. With each tag fixed to operate at a specific frequency, certain tracking applications may require 10 to 100 different tags, each operating at different frequencies. Since each tag requires a unique frequency, many different crystals must be available to the manufacturer in order to fabricate the tag in a timely manner. This poses supply-chain challenges, since each tag manufacturer must either keep many different crystals in stock, or wait for many weeks while the crystal fabricator produces a crystal at the desired frequency. Crystals also increase the bill of materials cost. Additionally, once manufactured, each tag is "locked into" to operating at the specific frequency that its crystal is designed for. This prevents users from repurposing a tag to replace a broken unit, or use in different applications that each may require different operating frequencies.

Virtually all commercial Very High Frequency (VHF) tags use a continuous wave radio-frequency output, an arrangement that is compatible with most VHF tracking receivers, but that fails to allow data transmission. Those tags that differ from this convention are special-purpose and cannot be reconfigured. Additionally, most VHF tags do not include programmable tag scheduling functionality, a useful feature that increases the effective tag lifetime by providing the capability to inhibit transmissions by the tag during specific times.

The reliance on a wide variety of different crystal parts, as well as an analog design, means that traditional tags rely on the availability of a relatively large number of very specific part numbers; problems in the availability of any of these parts can cause production delays. Those few commercial tags that do use a hybrid analog/digital design often rely on custom digital circuitry. These tags need to recover the high development costs of these components by charging a higher tag unit cost.

Though the necessity for smaller tracking tags is present across all user groups, researchers who study flying animals are subject to especially stringent mass limitations. The most widely used heuristic for sizing a tag on a flying animal allows no more than 4% of the animal's mass to be added as additional tag payload. This means that roughly 25% of birds require a tag with a mass of one gram or lower. Though this need is beginning to be met by tags based on conventional designs, these older designs do not yield sufficient operating lifetimes.

Thus, there is a need for a tracking device that can be used across a variety of applications. More specifically, there is a need for a small, cost effective tracking device that can be programmed to accommodate a wide frequency range and various modulation formats in addition to including a reliable scheduling functionality. The invention satisfies this need.

SUMMARY OF THE INVENTION

This invention introduces an extremely small and lightweight digitally-controlled programmable tracking device for radio tracking objects. The invention may be used with a wide variety of applications, for example, point-of-sale, inventory control, supply chain management, wildlife research such as wildlife radio telemetry, as well as to track objects such as personal items (e.g. cell phones, keys). Further applications may include any real-time locator systems (RTLS) or proximity sensing.

The tracking device according to the invention incorporates specific improvements to the following features over the current state-of-the-art: scheduling flexibility, operating frequency flexibility, modulation flexibility, bill of materials/cost, and tag mass. Furthermore, the invention integrates all of these features into a single device.

The invention allows flexible transmission scheduling and can be configured at fabrication or deployment time with a set calendar of transmission events, allowing each user to tailor the operations of the tracking device to their unique operating conditions, maximizing device runtime.

The tracking device overcomes operating frequency limitations by employing a programmable frequency synthesizer, allowing any specific frequency within a very broad range to be set using software. This feature solves many manufacturing and supply-chain issues and affords the end user much greater flexibility in selecting an operating frequency.

The tracking device according to the invention is programmable over a wide frequency range including both passive and active frequencies, for example, 120-140 KHz, 13.56 MHz, 433 MHz, 868-928 MHz, 2.45/5.8 GHz, 2.400 GHz-2.4835 GHz.

The device can be programmed to support a variety of modulation formats within a set of formats using a modulation function. Modulation formats include, for example, continuous wave (CW), Gaussian frequency-shift keying (GFSK), minimum-shift keying (MSK), Gaussian Minimum Shift Keying (GMSK), on-off keying (OOK), amplitude modulation (AM), frequency shift keying (FSK), and phase shift keying (PSK), to name a few. This flexibility allows the tracking device to be readily customized using software, allowing it to telemeter data, uniquely identify each tracking device with an ID, or transmit a signal suitable for any application such as time-of-flight tracking applications. For the vast majority of applications, these capabilities are configured via software and any related updates.

The programmable nature of the invention is accomplished with the same printed circuit board (PCB) components. The invention uses new, widely available commercial integrated circuits (IC's) that reduce the bill of materials, driving down assembly costs, tag unit costs, and tag mass.

The programmable scheduling of the tracking device allows the available energy to be used more efficiently, while the low parts count allows a greater proportion of the tag's total mass to be devoted to the power source.

According to the invention, "lifetime tags" powered by new, high-performance solar cells and suitable energy storage circuitry is provided in the tracking device. The device does not require batteries or separate crystals. Thus, an advantage of the invention includes a device that is operable on solar power thereby eliminating the need for batteries and associated problems such as battery replacement. The device's low energy consumption extends the life of the device as compared to traditional devices.

Another advantage of the invention includes a device that is small sized and lightweight, including for example less than one gram. This feature enables the device to be used with small animals and objects, as well as with intensive studies requiring numerous tracking devices.

Another advantage of the invention includes a device that provides automated localization in real-time without human intervention.

Common hardware allows mass-production and a simplified supply chain. Another advantage is that the device is programmable to provide low-cost customization and flexible signal modulation for different applications.

In addition, the invention provides complete automated position monitoring of thousands of devices in real-time, while consuming much lower power than conventional tracking devices. As an example, thousands of animals can be monitored simultaneously.

The invention and its attributes and advantages will be further understood and appreciated with reference to the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

Figure 1:
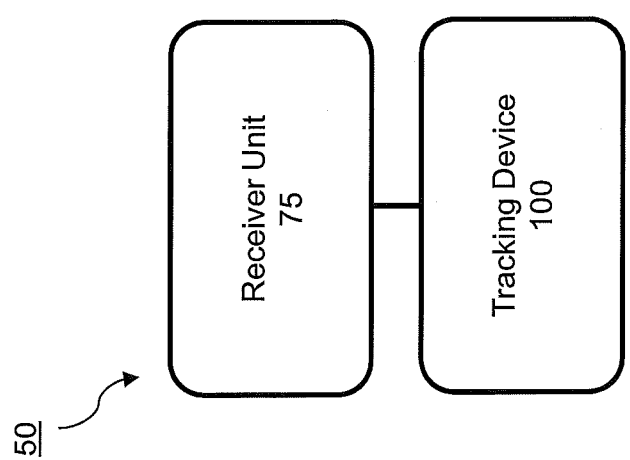
FIG. 1 illustrates a block diagram of an exemplary embodiment of a system according to the invention.

FIG. 1 illustrates a block diagram of an exemplary embodiment of a system 50 according to the invention. A tracking device 100 and receiver unit 75 are in two-way communication to exchange transmission events and receive events. Receiver unit 75 runs real-time matched filter detectors, and uses Global Positioning System (GPS) disciplined clocks to maintain synchronization. Each transmission event from the tracking device 100 to the receiver unit 75 is time-stamped. Similarly, each receive event from the receiver unit 75 to the tracking device 100 may be time-stamped. Various data may be computed by the tracking device 100 and receiver unit 75. Data may include position, temperature of the object or its surrounding environment, distance, height, etc. to name a few. As an example, position may be computed by the receiver unit 75, for example using a time of arrival algorithm, based on arrival times of each transmission event. In contrast, the tracking device 100 may compute position based on arrival times of a receive event.

Figure 2:
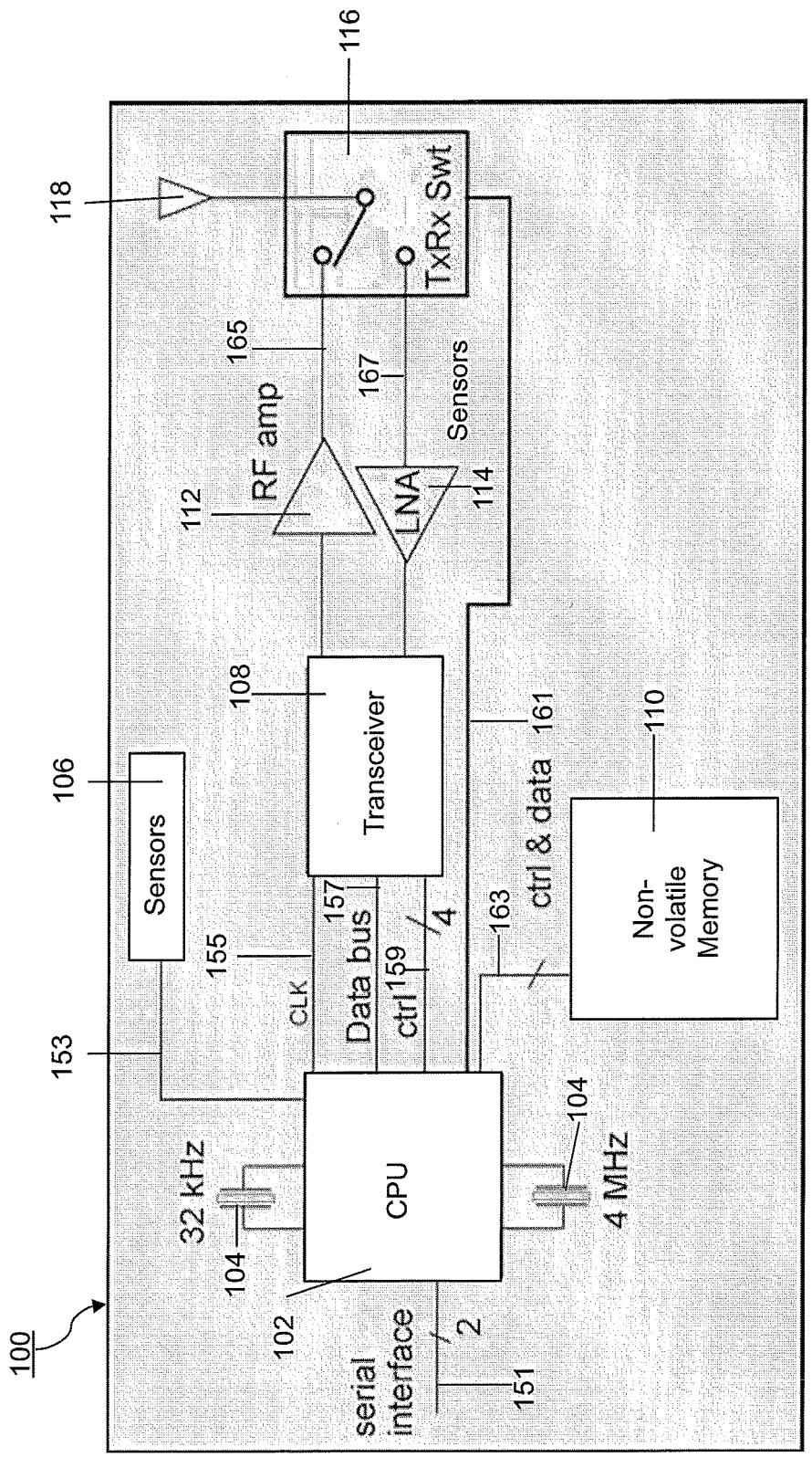
FIG. 2 illustrates a block diagram of an exemplary embodiment of a tracking device according to the invention.

FIG. 2 illustrates a block diagram of an exemplary embodiment of a tracking device 100 according to the invention. According to this embodiment, the device 100 weighs approximately 1.5 grams; however, any light-weight is contemplated.

The tracking device 100 includes a central processing unit (CPU) 102, one or more crystals 104, one or more sensors 106, a transceiver 108, a non-volatile memory module 110, a Radio Frequency (RF) amplifier 112, a low-noise amplifier 114, and a transceiver switch 116, and an antenna 118.

The CPU 102 provides onboard processing, aggregation and storage of data. The CPU 102 includes programmable software that enables a user to set program parameters for the device 100. Program parameters allow the device 100 to accommodate a wide frequency range and various modulation formats in addition to including a reliable scheduling functionality. The program parameters, of the device 100 can be configured at fabrication or deployment time, allowing each user to tailor the operations of the tracking device to a specific application with unique operating conditions, maximizing device runtime. The CPU 102 is in communication with a serial interface through trace 151 to facilitate programming of the device 100. Specifically, the program parameters selected by the user are communicated to the CPU 102 via trace 151. Depending on the program parameters selected by the user, the CPU 102 may further program the transceiver 108.

The hardware of the transceiver 108 includes a programmable frequency synthesizer that is programmable to generate any frequency within a range of frequencies from a single fixed time-base or oscillator. Allowing frequencies to be set and/or changed at any time affords the end user much greater flexibility in selecting an operating frequency. The tracking device according to the invention is programmable over a wide frequency range including both passive and active frequencies, for example, 120-140 KHz, 13.56 MHz, 433 MHz, 868-928 MHz, 2.45/5.8 GHz, 2.400 GHz-2.4835 GHz. However, any frequency is contemplated. For example, in one embodiment the invention uses ISM (Industrial, Scientific and Medical) bands that are open frequency bands that allow for operation without a license.

The transceiver 108 can be programmed to accommodate a modulation format selected from a set of formats using a modulation function. Modulation is used to vary one or more properties of a frequency signal with a modulating signal that typically contains information to be transmitted. Allowing modulation formats to be set and/or changed at any time affords the end user much greater flexibility in selecting an operating modulation format for any desired use of the tracking device 100. Examples of types of modulation formats, include for example, continuous wave (CW), Gaussian frequency-shift keying (GFSK), minimum-shift keying (MSK), Gaussian Minimum Shift Keying (GMSK), on-off keying (OOK), amplitude modulation (AM), frequency shift keying (FSK), and phase shift keying (PSK), allowing the device 100 to telemeter data, uniquely identify each tracking device with an ID, or transmit a signal suitable for any application such as time-of-flight tracking applications.

The CPU 102 can be programmed to accommodate any reliable scheduling functionality to allow flexibility in operation of the device 100. For example, the tracking device 100 can include a scheduling function that can be programmed to dispatch a specific transmission event cycle, e.g., transmit or receive frequencies including data at specific time intervals or to power off during certain time periods. Scheduling may also enable a set calendar of transmission events. Allowing flexibility in programming operation affords the end user much greater flexibility in selecting an operation schedule that may optimize results as well as decrease power consumption by the device increasing its operating lifetime.

The device 100 includes one or more crystals 104 connected to the CPU 102. However, in certain embodiments of the invention the one or more crystals 104 may be connected to the transceiver 108. The crystals 104 electromagnetically control the operating frequency of oscillators in the CPU 102 and the frequency synthesizer in the transceiver 108. It is contemplated that the frequency synthesizer can derive any output frequency from a single crystal frequency.

One or more sensors 106 may include any type of sensor such as wireless sensors. However, in one embodiment according to the invention the sensors 106 are solar cells that convert the energy of light directly into electricity by the photovoltaic effect. Sensor 106 provides the electricity via trace 153 to the CPU 102, including crystals 104.

Three traces 155, 157, 159 connect the CPU 102 and transceiver 108. Trace 155 provides clock signals for use in synchronizing the circuit operation. Trace 157 is the data bus that communicates the data obtained by the tracking device 100. Data may include position, temperature of the object or its surrounding environment, distance, height, etc. to name a few. Trace 159 communicates the programmed parameters relating to frequency, modulation format and operation schedule from the CPU 102 to the transceiver 108.

The data and the programmed parameters can be stored in non-volatile memory module 110. One example of a non-volatile memory module includes for example, a flash module. The non-volatile memory module 110 may be used to aggregate and store data and programmed parameters. For example, data may be aggregated by grouping similar events together, for example based on device ID and time-range values. The non-volatile memory module 110 and CPU 102 exchange data and programmed parameters via trace 163.

Transceiver 108 comprises both a transmitter and a receiver that share common circuitry. Based on the information provided by the CPU 102, transceiver 108 performs a transmission event. Specifically, the transceiver 108 produces radio frequency alternating current that is sent via trace 165 through a RF amplifier 112. The RF amplifier 112 increases the power of a signal for the antenna 118 to transmit. In a first state, a transceiver switch 116 applies the current to the multi-directional antenna 118 to produce radio signals that are received by the receiver unit 75 (see FIG. 1).

In addition to transmission events, the transceiver switch 116 may perform receive events. In a second state, the transceiver switch 116 receives radio signals from the antenna 118 that are sent via trace 167 through a low-noise amplifier 114 to the transceiver 108. The low-noise amplifier 114 amplifies possibly very weak signals, for example, captured by an antenna 118 before sending them to the transceiver 108. The signals include data that is sent via data bus 157 from the transceiver 108 to the CPU 102.

The CPU 102 and transceiver switch 116 communicate via trace 161. The CPU 102 may dictate whether the transceiver switch 116 is in a first state for transmission events or a second state for receive events. In addition, the switch 116 may communicate information to the CPU 102 via trace 161.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A lightweight device for tracking an object comprising:
   a central processing unit (CPU);
   one or more solar cells configured to power the lightweight device;
   a circuitry configured with an energy storage function;
   a transceiver; and
   an antenna configured to transmit signals from the lightweight device and receive signals to the device, wherein the lightweight device does not have a battery or a separate crystal.

2. The lightweight device for tracking an object according to claim 1 further comprising a transceiver switch including a first state that enables the lightweight device to transmit signals and a second state that enables the lightweight device to receive signals.

3. The lightweight device for tracking an object according to claim 1, wherein the tracking device weighs 1.5 grams or less.

4. The lightweight device for tracking an object according to claim 1, wherein the tracking device weighs 1 gram or less.

5. The lightweight device for tracking an object according to claim 1, wherein the central processing unit includes software with programmable program parameters to set a combination of operating frequencies, a modulation format, and an operation schedule, the central processing unit comprising a scheduling function programmable to schedule the lightweight device to transmit signals.

6. The lightweight device for tracking an object according to claim 1, wherein the central processing unit includes software with programmable program parameters to set one or more of an operating frequency, a modulation format, and an operation schedule, and the central processing unit comprising a scheduling function programmable to schedule the lightweight device to transmit signals.

7. The lightweight device for tracking an object according to claim 1, wherein the transceiver is configured to enable the lightweight device to transmit signals and to receive signals according to programmable program parameters, the transceiver comprising a frequency synthesizer and a modulation function, the frequency synthesizer programmable to generate any frequency within a range of frequencies and a modulation function programmable to select a modulation format from a set of formats.

8. The lightweight device for tracking an object according to claim 1, wherein the object is an object of inventor, an animal, or a personal item.

9. The lightweight device for tracking an object according to claim 8, wherein the object is a bird.

10. The lightweight device for tracking an object according to claim 1, wherein the lightweight device is a tag for tracking an animal throughout its entire lifetime without need of battery replacement.

11. The lightweight device for tracking an object according to claim 1 further comprising a non-volatile memory configured to aggregate and store data and programmed parameters.

12. The lightweight device for tracking an object according to claim 5, wherein the program parameters include scheduling of the signals received by the lightweight device.

13. The lightweight device for tracking an object according to claim 1 further comprising a Radio Frequency (RF) amplifier configured to amplify power of signals transmitted by the antenna.

14. The lightweight device for tracking an object according to claim 1 further comprising a low-noise amplifier configured to amplify power of signals received by the antenna.

15. The lightweight device for tracking an object according to claim 5, wherein the scheduling function is programmable to inhibit transmission of signals from the lightweight device during specified times.

16. The device for tracking an object according to claim 15, wherein the scheduling function is configured to allow available energy to be used efficiently.

17. The device for tracking an object according to claim 5, wherein the operating frequency is 120-140 KHz, 13.56 MHz, 433 MHz, 868-928 MHz, 2.45/5.8 GHz, 2.400 GHz-2.4835 GHz.

18. The device for tracking an object according to claim 5, wherein the modulation format is selected from the group consisting of: continuous wave (CW), Gaussian frequency-shift keying (GFSK), minimum-shift keying (MSK), Gaussian Minimum Shift Keying (GMSK), on-off keying (OOK), amplitude modulation (AM), frequency shift keying (FSK), and phase shift keying (PSK).

19. The device for tracking an object according to claim 1 further comprising a sensor, wherein the sensor is a solar cell sensor configured to receive varying amounts of light.

20. The device for tracking an object according to claim 19, wherein the varying amounts of light is converted to electricity and provided to the central processing unit through the circuitry.

* * * * *